(12) United States Patent
Mukavetz et al.

(10) Patent No.: US 8,862,361 B2
(45) Date of Patent: Oct. 14, 2014

(54) TURBINE ENGINE TRAINING MANUAL MODE FUEL FLOW CONTROL SYSTEM AND METHOD

(75) Inventors: Dale Mukavetz, Chandler, AZ (US); Guerry Buehman, Chandler, AZ (US)

(73) Assignee: Honeywell International Inc., Morristown, NJ (US)

(*) Notice: Subject to any disclaimer, the term of this patent is extended or adjusted under 35 U.S.C. 154(b) by 2433 days.

(21) Appl. No.: 11/679,584

(22) Filed: Feb. 27, 2007

(65) Prior Publication Data
US 2009/0326781 A1 Dec. 31, 2009

(51) Int. Cl.
G06F 19/00 (2011.01)
G06G 7/70 (2006.01)

(52) U.S. Cl.
USPC .................................. 701/100; 701/3; 701/14

(58) Field of Classification Search
USPC ............ 701/3, 4, 9, 11, 14; 60/39.02, 39.281, 60/39.091
See application file for complete search history.

(56) References Cited

U.S. PATENT DOCUMENTS

| | | | |
|---|---|---|---|
| 3,820,323 A | 6/1974 | Burnell et al. | |
| 4,302,931 A | 12/1981 | White et al. | |
| 4,478,038 A * | 10/1984 | Cropper et al. | 60/773 |
| 4,619,110 A * | 10/1986 | Moore | 60/39.091 |
| 4,718,229 A * | 1/1988 | Riley | 60/39.281 |
| 4,793,133 A | 12/1988 | White et al. | |
| 5,012,423 A | 4/1991 | Osder | |
| 5,303,142 A | 4/1994 | Parsons et al. | |
| 5,315,819 A * | 5/1994 | Page et al. | 60/39.282 |
| 5,403,155 A | 4/1995 | Head et al. | |
| 6,259,975 B1 | 7/2001 | Rollet et al. | |
| 6,325,331 B1 | 12/2001 | McKeown | |
| 6,721,644 B2 * | 4/2004 | Levine | 701/70 |

* cited by examiner

*Primary Examiner* — Rami Khatib
(74) *Attorney, Agent, or Firm* — Ingrassia Fisher & Lorenz, P.C.

(57) ABSTRACT

A method of controlling a gas turbine engine in a vehicle having an automatic system configured to control fuel flow includes determining whether a vehicle operator is requesting to manually control fuel. A pre-relinquishment value of an engine operating condition is determined while fuel flow is controlled by the automatic system. Fuel flow control is relinquished to the vehicle operator if the vehicle operator is requesting to manually control fuel flow and the pre-relinquishment value is within a predetermined range. A post-relinquishment value of the engine operating condition is determined while fuel flow is controlled by the vehicle operator. Fuel flow control is returned to the automatic system if the post-relinquishment value is not maintained within the predetermined range.

8 Claims, 4 Drawing Sheets

TURBINE ENGINE TRAINING MANUAL MODE FUEL FLOW CONTROL SYSTEM AND METHOD

FIELD OF THE INVENTION

The present invention relates to gas turbine engines and, more particularly, to improved methods and apparatus for controlling fuel flow to gas turbine engines through the selective use of automatic and manual fuel flow control.

BACKGROUND OF THE INVENTION

Gas turbine engines are frequently used to power helicopters, as well as various other vehicles and other devices. In helicopters, under ordinary flying conditions, fuel flow to the engine is typically controlled by an automatic fuel flow control system. The automatic fuel flow control system can be used to provide optimal fuel flow to the engine by automatically adjusting fuel flow based, for example, on measured values of various engine and helicopter operating conditions.

Helicopters with automatic engine control units are normally equipped with a manual mode system as backup to the automatic system should the automatic system fail. This manual mode allows the pilot direct manual control over engine fuel flow in order to maintain engine power and achieve a save landing. Helicopter pilots will also, as part of regular training exercises, wish to manually control engine fuel flow, in order to practice this very difficult situation where automatic control of the engine has been lost. However, while the pilot is flying the helicopter in the manual training mode, typically fuel flow to the engine is controlled exclusively, or almost exclusively, by the helicopter pilot, without the benefit of various features of the automatic fuel flow control system, such as automatic engine fuel flow adjustment based on values of various engine operating conditions.

Accordingly, there is a need for a system, device, or method for allowing manual control of fuel flow to a gas turbine engine during training, while retaining features of an automatic fuel flow control system available to the pilot should the pilot inadvertently cause an unsafe flight condition for either engine or helicopter to occur during this training. The present invention addresses at least this need.

SUMMARY OF THE INVENTION

The present invention provides a method of controlling a gas turbine engine in a vehicle having an automatic system configured to control fuel flow. In one embodiment, and by way of example only, the method comprises the steps of determining whether a vehicle operator is requesting to manually control fuel determining a pre-relinquishment value of an engine operating condition while fuel flow is controlled by the automatic system, relinquishing fuel flow control to the vehicle operator, if the vehicle operator is requesting to manually control fuel flow and the pre-relinquishment value is within a predetermined range, determining a post-relinquishment value of the engine operating condition while fuel flow is controlled by the vehicle operator, and returning fuel flow control to the automatic system, if the post-relinquishment value is not within the predetermined range.

The invention also provides a program product for controlling a gas turbine engine in a vehicle having an automatic system configured to control fuel flow. In one embodiment, and by way of example only, the program product comprises a program and a computer-readable signal bearing media bearing the program. The program is configured to determine whether a vehicle operator is requesting to manually control fuel flow, determine a pre-relinquishment value of an engine operating condition while fuel flow is controlled by the automatic system, relinquish fuel flow control to the vehicle operator, if the vehicle operator is requesting to manually control fuel flow and the pre-relinquishment value is within a predetermined range, determine a post-relinquishment value of the engine operating condition while fuel flow is controlled by the vehicle operator, and return fuel flow control to the automatic system, if the post-relinquishment value is not within the predetermined range.

The invention also provides a fuel flow control system for a helicopter having an engine. In one embodiment, and by way of example only, the fuel flow control system comprises a user interface, a sensor, and a processor. The user interface is configured to detect when a vehicle operator is requesting to manually control fuel flow and selectively supply a manual request signal. The sensor is configured to sense an engine operating condition and apply sensor signals representative thereof. The processor is coupled to receive the manual request signal and the sensor signals, and is configured to automatically control fuel flow to the engine, relinquish fuel flow control to the vehicle operator, if the vehicle operator is requesting to manually control fuel flow and the engine operating condition is within a predetermined range, and return to automatic fuel flow control, if the engine operating condition is outside the predetermined range.

Other independent features and advantages of the preferred device and method will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a particular type of turbine engine or in a particular vehicle. Thus, although the present embodiment is, for convenience of explanation, depicted and described as being implemented in a helicopter, it will be appreciated that it can be implemented in various other environments.

Figure 1:
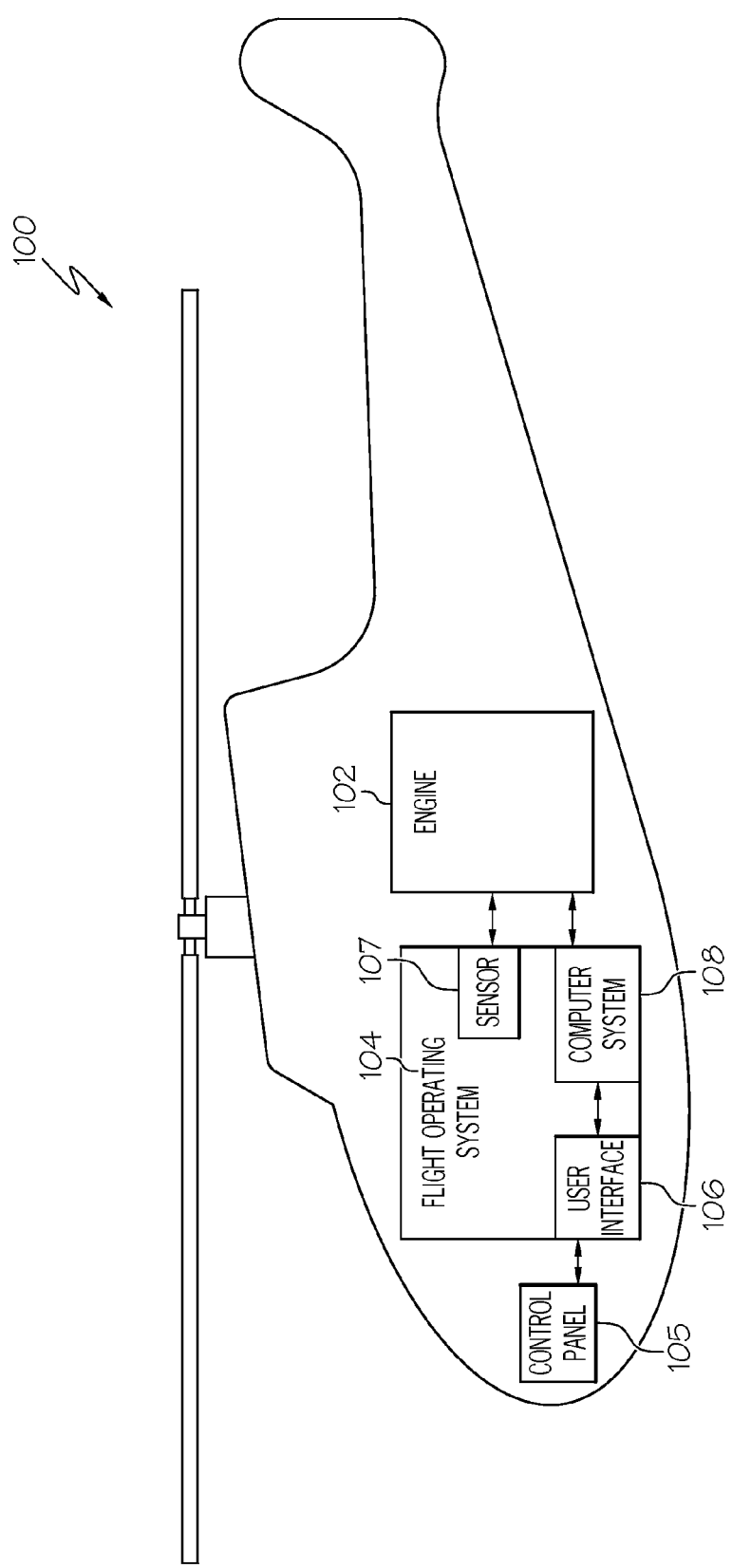
FIG. 1 is a simplified schematic drawing of a helicopter having an engine and a flight operating system.

FIG. 1 depicts an exemplary embodiment of a helicopter 100. The helicopter 100 includes an engine 102 and a flight operating system 104. The helicopter 100 may also include a control panel 105 and/or other control devices. The engine 102 is preferably a gas turbine engine, and the flight operating system 104 preferably includes a user interface 106, a sensor suite 107, and a computer system 108.

The user interface 106 is configured to detect when an operator of the helicopter 100, such as a pilot, is requesting to manually control fuel flow to the engine 102, and is further configured to selectively supply a manual request signal to the computer system 108 when the operator has made such a request. The operator may wish to make such a request to manually control fuel flow, for example, during training. The user interface 106 may include a non-depicted joystick, a non-depicted control switch, and/or one or more of various other types of devices for detecting when the operator is requesting to manually control fuel flow to the engine 102, or may be coupled to a joystick, switch, and/or other device, for example from the control panel 105. Additionally, as will be described further below, the user interface 106 may be part of the computer system 108 and/or other systems.

The sensor suite 107 includes one or more sensors configured to sense various engine operating conditions, and to supply sensor signals representative thereof to the computer system 108. The sensor suite 107, although depicted in FIG. 1 using a single functional block, may include any number of different types of sensors to sense various different types of engine operating conditions and/or various other types of conditions over various points in time.

The computer system 108 is coupled to receive the manual request signal from the user interface 106 and the sensor signals from the sensor suite 107. The computer system 108 is normally configured to automatically control fuel flow to the engine 102. However, if the vehicle operator is requesting to manually control fuel flow and the engine operating conditions are within a predetermined range, the computer system 108 will relinquish fuel flow control to the vehicle operator. Moreover, if the engine operating conditions fall outside the predetermined range at any time while the vehicle operator is manually controlling fuel flow, then the computer system 108 reconfigures the system to automatically control fuel flow.

As depicted in FIG. 1, preferably the computer system 108, and software used therein, is integral with the flight operating system 104, and thereby maximizes efficiency without requiring additional hardware, other components, or associated weight or space. In addition, preferably the computer system 108 is constantly monitoring post-relinquishment operating values of the engine 102 against allowable values to determine whether a post-relinquishment engine operating condition outside allowable limits as determined by the automatic control has been requested.

Figure 2:
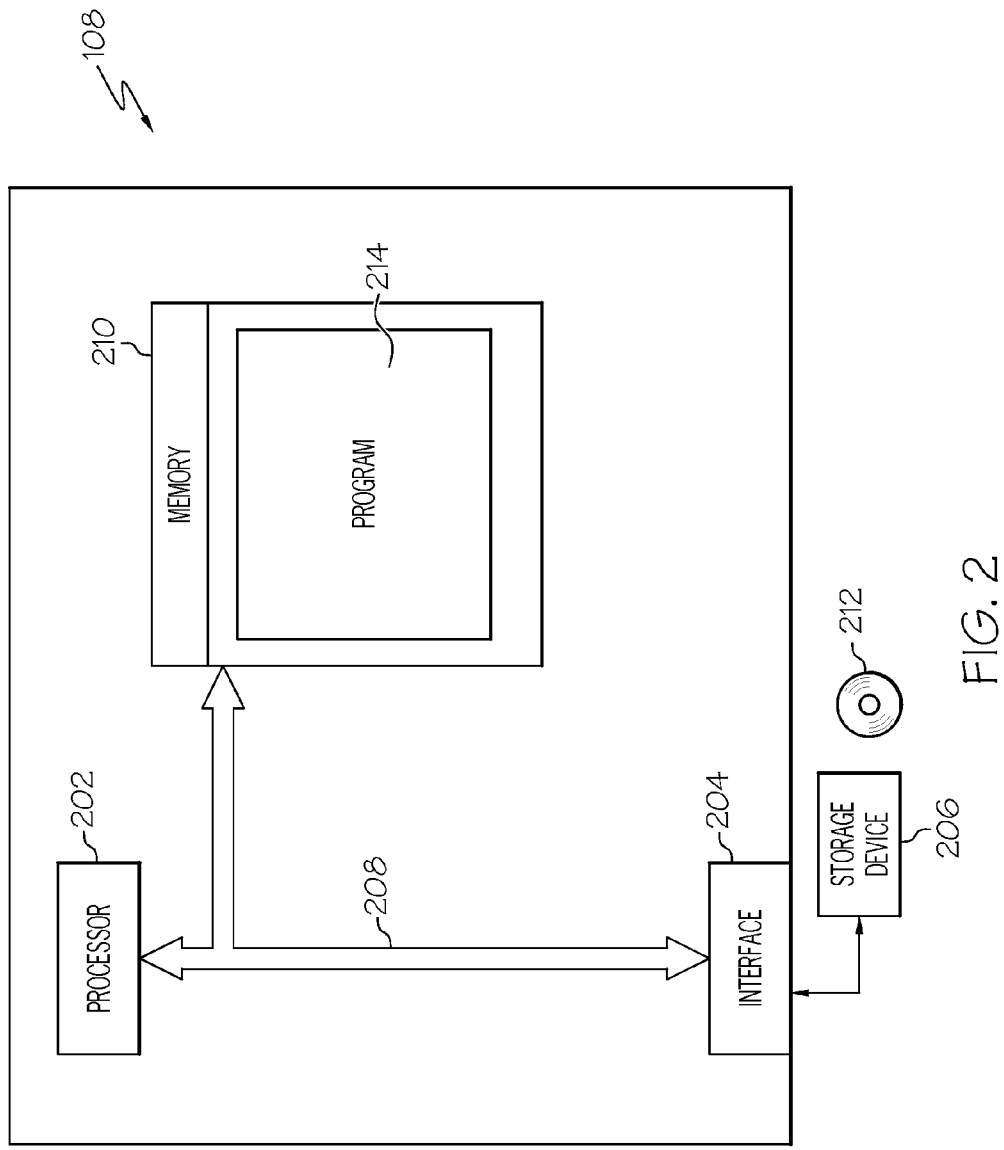
FIG. 2 is a functional block diagram of a computer system that may be used in the flight operating system of FIG. 1.

Turning now to FIG. 2, an exemplary computer system 108 is illustrated by way of example. The computer system 108 illustrates the general features of a computer system that can be used in the flight operating system 104. Of course, these features are merely exemplary, and it should be understood that the computer system 108 can include different types of hardware that can include one or more different features. It should be noted that the computer system 108 can be implemented in many different environments, such as within a particular apparatus or system, or remote from a particular apparatus or system. Nonetheless, the exemplary computer system 108 includes a processor 202, an interface 204, a storage device 206, a bus 208, and a memory 210.

The processor 202 performs the above-described computation and control functions of the computer system 108, and may comprise any type of processor, include single integrated circuits such as a microprocessor, or may comprise any suitable number of integrated circuit devices and/or circuit boards working in cooperation to accomplish the functions of a processing unit. The processor 202 may comprise multiple processors implemented on separate systems. During operation, the processor 202 executes the programs contained within the memory 210 and as such, controls the general operation of the computer system 108.

The memory 210 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 210 may be a single type of memory component, or it may be composed of many different types of memory components. In addition, the memory 210 and the processor 202 may be distributed across several different computers that collectively comprise the computer system 108. For example, a portion of the memory 210 may reside on a computer within a particular apparatus or process, and another portion may reside on a remote computer.

The bus 208 serves to transmit programs, data, status and other information or signals between the various components of the computer system 108. The bus 208 can be any suitable physical or logical means of connecting computer systems and components. This includes, but is not limited to, direct hard-wired connections, fiber optics, infrared and wireless bus technologies.

The interface 204 allows communication to the computer system 108, and can be implemented using any suitable method and apparatus. The interface 204 is configured to detect commands from the operator of the helicopter 100, such as whether the operator is requesting to manually control fuel flow to the engine 102, and to selectively supply a manual request signal to the processor 202 and the memory 210 when the vehicle operator has made such a request. Accordingly, the interface 204 of FIG. 2 may perform the above-described functions of the user interface 106 of FIG. 1, and/or may operate in conjunction with the user interface 106 of FIG. 1 to collectively perform these functions. Accordingly, the interface 204 may include a non-depicted joystick, a non-depicted control switch, and/or one or more of various other types of devices for detecting when the operator is requesting to manually control fuel flow to the engine 102. The interface 204 may also include one or more network interfaces to communicate to other systems, terminal interfaces to communicate with technicians, and storage interfaces to connect to storage apparatuses such as the storage device 206.

The storage device 206 can be any suitable type of storage apparatus, including direct access storage devices such as hard disk drives, flash systems, floppy disk drives and optical disk drives, among various other types of storage apparatus. In the embodiment of FIG. 2, the storage device 206 comprises a disk drive device that uses disks 212 to store data.

The computer system 108 may also include one or more non-depicted sensors, and/or various other devices. While the sensor suite 107 is not depicted in FIG. 2 as part of the computer system 108, the sensor suite 107 may be part of the computer system 108, and/or one or more different computer systems and/or other systems, in certain embodiments.

In accordance with a preferred embodiment, the computer system 108 includes a program 214 for use in operating the engine 102 and controlling fuel flow thereto. During operation, the program 214 is stored in the memory 210 and executed by the processor 202. As one example implementation, the computer system 108 may also utilize an Internet website, for example, for providing or maintaining data or performing operations thereon. Preferably, the program 214 is integral with the rest of the computer system 108, and with the flight operating system 104.

It should be understood that while the embodiment is described here in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 212), and transmission media such as digital and analog communication links, among various other different types of signal bearing media.

Figure 3:
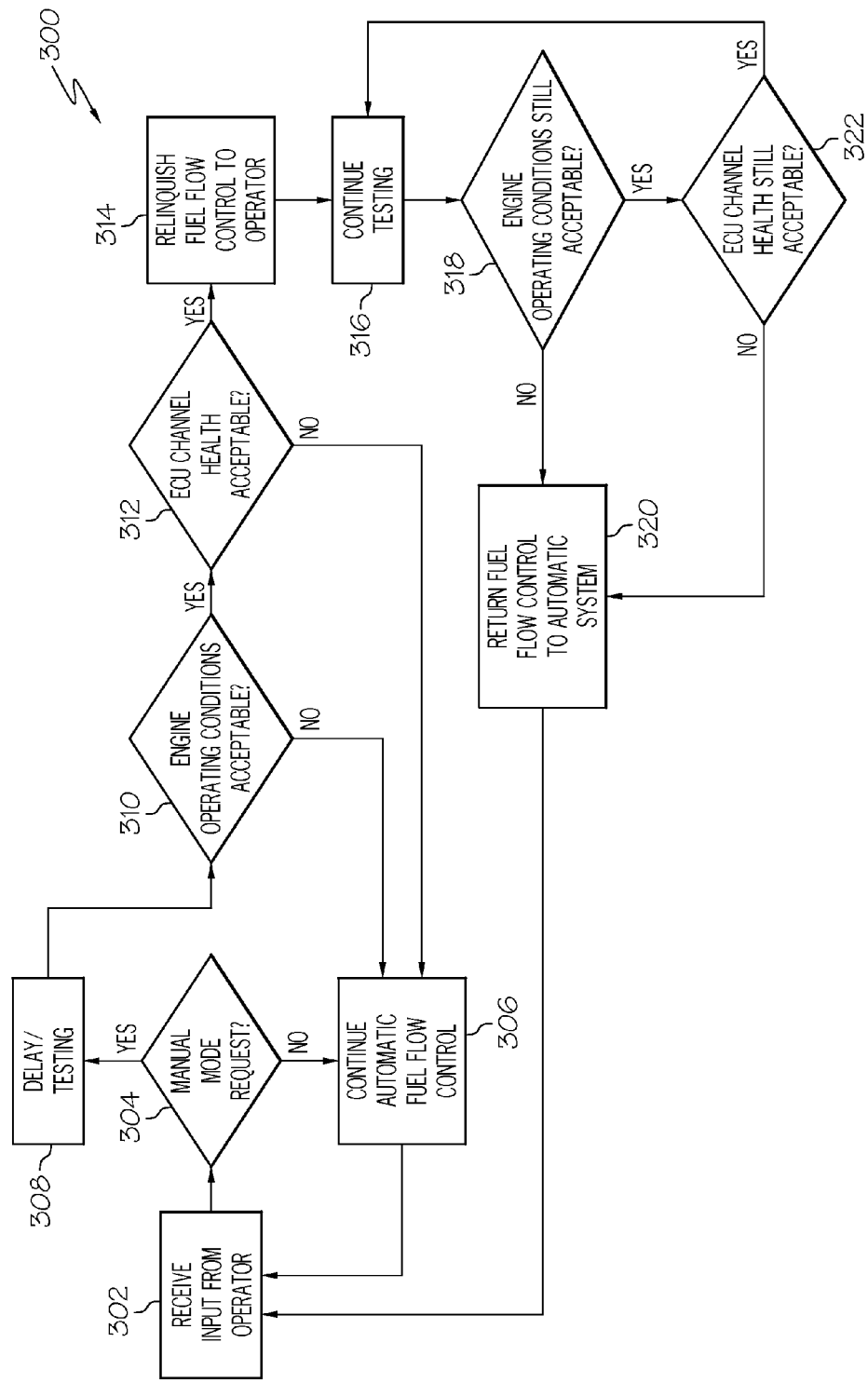
FIG. 3 is a flowchart of a method for controlling fuel flow to an engine such as the engine of FIG. 1, and that can be implemented using the computer system of FIG. 2.

Turning now to FIG. 3, a fuel flow control process 300 is depicted for controlling engine fuel flow. As shown in FIG. 3, the fuel flow control process 300 begins with step 302, in which input is received from the operator of the helicopter 100. Such input is preferably received from the operator via the user interface 106 of FIG. 1 and/or the interface 204 of FIG. 2, and is preferably then transmitted to the processor 202 of the computer system 108. During step 302, the helicopter 100 is preferably operating in a state in which fuel flow is being provided to the engine 102 automatically via the flight operating system 104.

Next, in step 304, a determination is made, from the input received in step 302, as to whether the operator is requesting to manually control the fuel flow to the engine 102. This determination, and various other determinations and actions based thereon, is preferably preformed by the processor 202 of FIG. 2. If it is determined in step 304 that the operator is not requesting to manually control the fuel flow, then, in step 306, automatic fuel flow continues to be provided to the engine 102 via the flight operating system 104, and the process returns to step 302.

Alternatively, if it is determined in step 304 that the operator is requesting to manually control the fuel flow, then the process proceeds to step 308. In step 308 a time delay is initiated, and testing is conducted for various engine operating conditions, before a determination is made as to whether the request to manually control the fuel flow will be granted. Next, in step 310, a determination is made as to whether various engine operating conditions are within their respective predetermined ranges of acceptable values. The predetermined ranges of acceptable values may be determined from manufacturer specifications or manuals, prior testing, literature in the field, and/or various other sources. In a preferred embodiment, the tested operating conditions include collective rotor system pitch, engine inlet temperature, engine inlet pressure, gas generator rotational speed, output shaft rotational speed, measured gas temperature, compressor discharge pressure, engine output torque, power lever angle, and rotor speed, certain comparisons therebetween, and/or comparisons of changes in values of one or more operating conditions over time. Various other engine operating conditions, other measures, and/or combinations thereof may also be determined.

If it is determined in step 310 that one or more of the engine operating conditions are outside of their respective acceptable ranges, then the process proceeds to the above-described step 306, in which automatic fuel flow continues to be provided to the engine 102 via the flight operating system 104, and the process returns to step 302. Effectively, the operator's request to manually control engine fuel flow has been denied. Conversely, if it is determined in step 310 that each of the engine operating conditions is within its respective acceptable range, then the process proceeds to step 312, in which various engine control unit (ECU) channels are tested. If it is determined in step 312 that none of the ECU channels are sufficiently healthy according to one or more predetermined measures (for example, whether the ECU channels are operating with at least a predetermined level of health, based on manufacturer specifications, literature in the field, experimental data, prior experience, and/or various other criteria), then the process proceeds to the above-described step 306, in which automatic fuel flow continues to be provided to the engine 102 via the flight operating system 104, and the process returns to step 302.

Conversely, if it is determined in step 312 that at least one of the ECU channels is sufficiently healthy, then the process proceeds to step 314, in which fuel flow control is relinquished to the operator for manual control. The helicopter 100 then continues to be operated with manual fuel flow control through the next steps 316 and 318, in which testing of engine operating conditions continues (step 316) and determinations are made pertaining thereto (step 318). Specifically, based on the testing in step 316, determinations are made in step 318 as to whether various engine operating conditions are still within their respective predetermined ranges of acceptable values.

Preferably, the tested operating conditions, and their respective parameters, are similar or identical to those discussed in connection with step 310 above, and preferably include collective rotor system pitch, engine inlet temperature, engine inlet pressure, gas generator rotational speed, output shaft rotational speed, measured gas temperature, compressor discharge pressure, engine output torque, power lever angle, and rotor speed, certain comparisons therebetween, and/or comparisons of changes in values of one or more operating conditions over time, although various other engine operating conditions, other measures, and/or combinations thereof may also be determined.

If it is determined in step 318 that one or more of the engine operating conditions is outside its respective acceptable range, then the process proceeds to step 320, in which fuel flow control is automatically returned to automatic control, and the process then returns to step 302. Conversely, if it is determined in step 318 that each of the engine operating conditions is within its respective acceptable range, then the process proceeds to step 322, in which various engine control unit (ECU) channels are again tested.

If it is determined in step 322 that none of the ECU channels are sufficiently healthy (preferably using the same or similar criteria as used in step 312 above), then the process proceeds to the above-described step 320. Alternatively, if it is determined in step 322 that at least one of the ECU channels is sufficiently healthy, then the process returns to the above-described step 316.

Accordingly, the flight operating system 104 continually monitors the engine operating conditions while the operator is manually controlling the flow of fuel to the engine 102. The fuel flow control will then be automatically returned to the automatic control of the flight operating system 104 if, at any time, one or more of the engine operating conditions are outside of their respective ranges, or if none of the ECU channels are operating.

Additionally, as mentioned above in connection with FIG. 1, the post-relinquishment operating values of the engine 102 and ECU channels are preferably continually monitored and compared against allowable values to determine whether a post-relinquishment engine operating condition and/or ECU channel health are outside allowable limits as determined by the automatic control has been requested. In addition, through the continuous loop of FIG. 3, it is intended that the above-referenced testing and monitoring are continuously conducted for various engine operating conditions, and determinations made as to whether various engine operating conditions are within their respective predetermined ranges of acceptable values, including such testing and monitoring regarding collective rotor system pitch, engine inlet temperature, engine inlet pressure, gas generator rotational speed, output shaft rotational speed, measured gas temperature, compressor discharge pressure, engine output torque, power lever angle, and rotor speed, certain comparisons therebetween, and/or comparisons of changes in values of one or more operating conditions over time, among various other engine operating conditions, other measures, and/or combinations thereof may also be continuously tested, measured, and determined.

Figure 4:
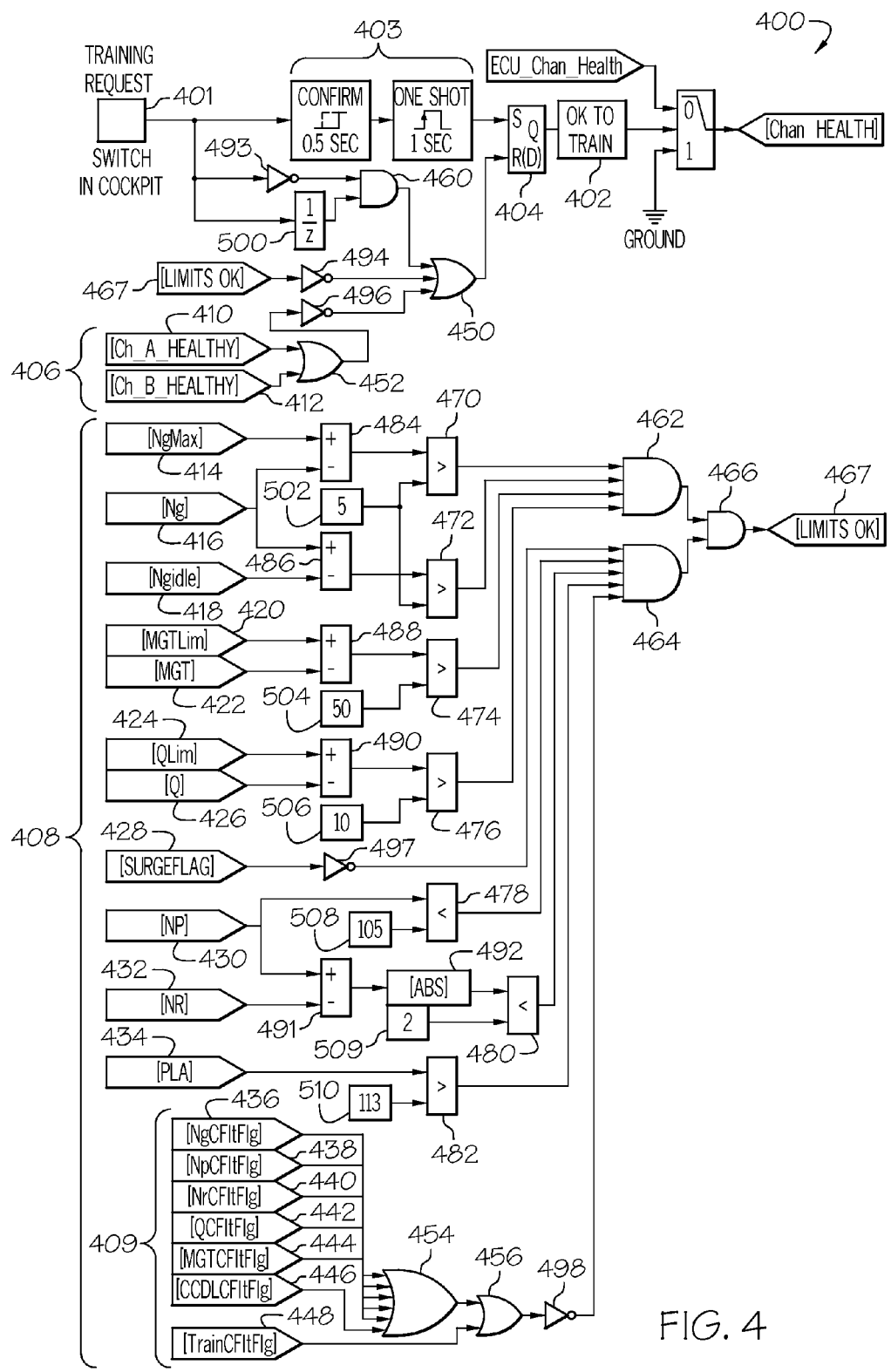
FIG. 4 is a functional block diagram of a fuel flow control logic that can be used in the method of FIG. 3.

FIG. 4 is a functional block diagram of an embodiment of fuel flow control logic 400 that can be used to implement the fuel flow control process 300, and will now be described. Before doing so, however, it is noted that the fuel flow control logic 400 is depicted using various schematic symbols that represent physical components. It is also noted that the above-described testing, monitoring, and determinations regarding engine 102 inputs and conditions, ECU channel parameters, and any other parameters are preferably continuously conducted using the fuel flow control logic of 400, even while the operator is training under a manual mode.

As depicted in FIG. 4 and previously described, the fuel flow control logic 400 receives a manual fuel flow control request 401 from the operator and, upon receipt thereof, makes a determination as to whether the manual fuel flow control request 401 is acceptable, given current operating conditions. If the manual fuel flow control request 401 is acceptable, the fuel flow control logic 400 sets a manual fuel flow flag 402 that can be stored in the memory 210 of FIG. 2 and used to relinquish, to the operator, manual fuel flow control. Conversely, if the manual fuel flow control request 401 is not acceptable, then the manual fuel flow flag 402 is not set. When the manual fuel flow flag 402 is not set, the request for manual fuel flow control is denied if the fuel flow is currently being controlled automatically, and the fuel flow control is automatically returned to automatic control if the fuel flow control is currently being controlled manually by the operator.

The fuel flow control logic 400 utilizes various ECU channel measures 406 of ECU channel operation and various engine operating conditions 408. In the depicted embodiment, the ECU channel measures 406 include a first ECU channel measure 410 representing whether a first ECU channel is operating at a sufficient level of health, and a second ECU channel measure 412 representing whether a second ECU channel is operating at a sufficient level of health. The engine operating conditions 408 include maximum gas generator rotational speed 414, measured gas generator rotational speed 416, idle gas generator rotational speed 418, gas temperature limit 420, measured gas temperature 422, engine output torque limit 424, measured engine output torque 426, a surge flag 428, measured output shaft rotational speed 430, measured rotor speed 432, and power lever angle 434, along with various engine operation flags 409, including a gas generator rotational speed flag 436, an output shaft rotational speed flag 438, a rotor speed flag 440, an engine output torque flag 442, a measured gas temperature flag 444, a collective pitch flag 446, and a training flag 448, in addition to the above-mentioned surge flag 428. However, it will be appreciated that various other ECU channel measures 406 and engine operating conditions 408 may also be used, instead and/or in addition to those depicted in FIG. 4.

Also as shown in FIG. 4, the fuel flow control logic 400 includes manual fuel flow request confirmation logic 403; final compilation logic 404; first, second, third and fourth OR logic 450, 452, 454, 456, respectively; first, second, third, and fourth AND logic 460, 462, 464, and 466, respectively; a Limits OK Flag 467; first, second, third, fourth, fifth, sixth, and seventh COMPARATOR logic 470, 472, 474, 476, 478, 480, and 482, respectively; first, second, third, fourth, and fifth ADDITION/SUBTRACTION logic 484, 486, 488, 490, and 491, respectively; first, second, third, fourth, and fifth INVERTER logic 493, 494, 496, 497, and 498, respectively; DELAY logic 500; an absolute value function 492, and first, second, third, fourth, fifth, and sixth stored values 502, 504, 506, 508, 509, and 510, respectively.

The manual fuel flow control request 401 is configured to transmit a logic value of "1" if an operator request to manually control fuel flow has been detected, and a logic value of "0" if an operator request to manually control fuel flow has not been detected. The manual fuel flow request confirmation logic 403 conducts multiple checks on the manual fuel flow control request 401 to ensure that the operator is indeed requesting to manually control fuel flow. Preferably, the manual fuel flow request confirmation logic 403 checks that the operator has engaged a manual training mode switch for a predetermined time period (at least one half of a second in the depicted embodiment), and that the operator has not commanded the switch "off". If these checks confirm that the operator is requesting to manually control fuel flow, then the manual fuel flow request confirmation logic 403 transmits a logic value of "1" to the final compilation logic 404. Otherwise, the manual fuel flow request confirmation logic 403 transmits a logic value of "0" to the final compilation logic 404.

The final compilation logic 404, which implements a SET-RESET flip-flop, in turn, receives the logic value from the manual fuel flow request confirmation logic 403, along with a logic value supplied from the first OR logic 450. The final compilation logic 404 sets the manual fuel flow flag 402, thereby granting the operator's request to manually control fuel flow, if the logic value from the manual fuel flow request confirmation logic 403 is "1" and the logic value from the first OR logic 450 is equal to "0". Otherwise, the final compilation logic 404 does not set the manual fuel flow flag 402, thereby maintaining automatic fuel flow control to the engine 102.

The manual fuel flow control request 401 is also provided to the first INVERTER logic 493 and to the DELAY logic 500, both of which then transmit respective logic values to the first AND logic 460. The first INVERTER logic 493 transmits a logic value of "0" if the operator is requesting to manually control fuel flow, and a logic value of "1" if the operator is not requesting to manually control fuel flow. The DELAY logic 500 transmits a logic value representing the previous logic value supplied from the manual fuel flow control request 401. The first AND logic 460 transmits a logic value of "1" to the first OR logic 450 if the logic values from the first INVERTER logic 493 and the DELAY logic 500 are both equal to "1"—otherwise, the first AND logic 460 transmits a logic value of "0" to the first OR logic 450.

The second INVERTER logic 494 transmits a logic value to the first OR logic 450 pertaining to the Limits OK Flag 467, which, as will be described further below, represents a value of whether each of the engine operating conditions 408 are within their respective acceptable ranges. Specifically, if each of the engine operating conditions 408 are within their respective acceptable ranges, the Limits OK Flag 467 is set to a logic value of "1". Conversely, if one or more of the engine operating conditions 408 are outside of their respective acceptable ranges, then the Limits OK Flag 467 is set to a logic value of "0". The Limits OK Flag 467 is input to the second INVERTER logic 494, which in turn transmits an appropriate logic value to the first OR logic 450.

The third INVERTER logic 496 transmits, to the first OR logic 450, a logic value pertaining to the ECU channel measures 406. Specifically, the first ECU channel measure 410 transmits a logic value of "1" to the second OR logic 452 if a first ECU channel is operating with a sufficient level of health, and otherwise transmits a logic value of "0" to the second OR logic 452. Similarly, the second ECU channel measure 412 transmits a logic value of "1" to the second OR logic 452 if a second ECU channel is operating with a sufficient level of health, and otherwise transmits a logic value of "0" to the second OR logic 452. If at least one of the logic values from the first ECU channel measure 410 and the second ECU channel measure 412 is equal to "1", then the second OR logic 452 transmits a logic value of "1" to the third INVERTER logic 496, which in turn transmits a logic value of "0" to the first OR logic 450. Conversely, if the logic values from the first and second ECU channel measures 410, 412 are both equal to "0", then the second OR logic transmits a logic value of "0" to the third INVERTER logic 496, which in turn transmits a logic value of "1" to the first OR logic 450.

The first OR logic 450 transmits a logic value of "1" to reset (R) input of the final compilation logic 404 if one or more of the logic values from the first AND logic 460, the second INVERTER logic 494, or the third INVERTER logic 496 are equal to "1". Otherwise, the first OR logic 450 transmits a logic value of "0" to the final compilation logic 404.

The above-mentioned Limits OK Flag 467 is supplied from the fourth AND logic 466, which receives logic values from the second and third AND logic 462, 464, respectively. The logic value supplied by the fourth AND logic 466, and therefore the Limits OK Flag 467, is a logical "1" if the transmitted values from both the second and third AND logic 462, 464 are a logical "1". Conversely, if one or more of the logic values transmitted by the second and third AND logic 462, 464 are a logical "0", then the fourth AND logic 466, and therefore the Limits OK Flag 467, are a logical "0".

As will be described in greater detail below, the second AND logic 462 receives logic values from the first, second, third, and fourth COMPARATOR logic 470, 472, 474, and 476. The second AND logic 462 transmits a logic value of "1" to the fourth AND logic 466 if each of these values are equal to "1"—otherwise, the second AND logic 462 transmits a logic value of "0" to the fourth AND logic 466. The third AND logic 464 receives logic values form the fifth, sixth, and seventh COMPARATOR logic 478, 480, and 482, and from the fourth and fifth INVERTER logic 497, 498. The third AND logic 464 transmits a logic value of "1" to the fourth AND logic 466 if each of these values are equal to "1"— otherwise, the third AND logic 464 transmits a logic value of "0" to the fourth AND logic 466.

The first COMPARATOR logic 470 transmits a logic value of "1" to the second AND logic 462 if the difference between maximum gas generator rotational speed 414 and measured gas generator rotational speed 416, as determined by the first addition/subtraction logic 484, is greater than the stored value 502. Otherwise, the first COMPARATOR logic 470 transmits a logic value of "0" to the second AND logic 462. In the depicted embodiment the first stored value 502 is equal to five, although different values may also be used.

The second COMPARATOR logic 472 transmits a logic value of "1" to the second AND logic 462 if the difference between the measured gas generator rotational speed 416 and the idle gas generator rotational speed 418, as determined by the second addition/subtraction logic 486, is greater than the first stored value 502. Otherwise, the second COMPARATOR logic 472 transmits a logic value of "0" to the second AND logic 462. In the depicted embodiment the first stored value 502 is used for both the first and second COMPARATOR logic 470, 472; however, this may differ in other embodiments.

The third COMPARATOR logic 474 transmits a logic value of "1" to the second AND logic 462 if the difference between the gas temperature limit 420 and the measured gas temperature 422, as determined by the third addition/subtraction logic 488, is greater than the second stored value 504. Otherwise, the third COMPARATOR logic 474 transmits a logic value of "0" to the second AND logic 462. In the depicted embodiment the second stored value 504 is equal to fifty, although different values may also be used.

The fourth COMPARATOR logic 476 transmits a logic value of "1" to the second AND logic 462 if the difference between the engine output torque limit 424 and the measured engine output torque 426, as determined by the fourth addition/subtraction logic 490, is greater than the third stored value 506. Otherwise, the fourth COMPARATOR logic 476 transmits a logic value of "0" to the second AND logic 462. In the depicted embodiment the third stored value 506 is equal to ten, although different values may also be used.

The fourth INVERTER logic 497 transmits a logic value of "0" to the third AND logic 464 if the surge flag 428 is set to a logic value of "1" (meaning that a surge has occurred). Conversely, if the surge flag 428 is set to a logic value of "0" (meaning that a surge has not occurred), then the fourth INVERTER logic 497 transmits a logic value of "1" to the third AND logic 464.

The fifth COMPARATOR logic 478 transmits a logic value of "1" to the third AND logic 464 if the measured output shaft rotational speed 430 is less than the fourth stored value 508. Otherwise, the fifth COMPARATOR logic 478 transmits a logic value of "0" to the third AND logic 464. In the depicted embodiment the fourth stored value 508 is equal to one hundred and five, although different values may also be used.

The sixth COMPARATOR logic 480 transmits a logic value of "1" to the third AND logic 464 if the absolute value of the difference between the measured output shaft rotational speed 430 and the measured rotor speed 432, as determined by the fifth addition/subtraction logic 491 and the absolute value function 492, respectively, is less than the fifth stored value 509. Otherwise, the sixth COMPARATOR logic 480 transmits a logic value of "0" to the third AND logic 464. In the depicted embodiment the fifth stored value 509 is equal to two, although different values may also be used.

The seventh COMPARATOR logic 482 transmits a logic value of "1" to the third AND logic 464 if the power lever angle 434 is greater than the sixth stored value 510. Otherwise, the seventh COMPARATOR logic 482 transmits a logic value of "0" to the third AND logic 464. In the depicted embodiment the sixth stored value 510 is equal to one hundred and thirteen, although different values may also be used.

The fifth INVERTER logic 498 receives the logic value from the fourth OR logic 456, which receives the logic values of the training flag 448 and the third OR logic 454. The third OR logic 454 receives the logic values of the gas generator rotational speed flag 436, the output shaft rotational speed flag 438, the rotor speed flag 440, the engine output torque flag 442, the measured gas temperature flag 444, and the collective pitch flag 446. If one or more of these engine operation flags 409 are set to a logic value of "1", then the third OR logic 454 transmits a logic value of "1" to the fourth OR logic 456. Otherwise, the third OR logic 454 transmits a logic value of "0" to the fourth OR logic 456. If at least one of the logic values from the third OR logic 454 and the training flag 448 are a logical "1", then the fourth OR logic 456 transmits a logic value of "1" to the fifth INVERTER logic 498, which in turn transmits a logic value of "0" to the third AND logic 464. Otherwise, the fourth OR logic 456 transmits a logic value of "0" to the fifth INVERTER logic 498, which in turn transmits a logic value of "1" to the third AND logic 464.

Accordingly, if any of the engine operation flags 409 indicate an out of range condition, then the fifth INVERTER logic 498 transmits a logic value of "0" to the third AND logic 464, and the Limits OK Flag 467 will not be set, thereby indicating that the manual fuel flow control request 401 should not be granted. Similarly, the Limits OK Flag 467 will also not be set if any of the other engine operating conditions 408 or comparisons thereof are out of range, as determined by the first, second, third, fourth, fifth, sixth, and seventh COMPARATOR logic 470, 472, 474, 476, 478, 480, and 482, or if the surge flag 428 indicates that a surge is present.

The fuel flow control logic 400 described above and illustrated in FIG. 4 is merely exemplary of a particular preferred embodiment. It will be appreciated, however, that the fuel flow control logic 400 can be implemented using various configurations and/or logic schemes. Regardless of the particular logic scheme used, the fuel flow control process 300 and the flight operating system 104 allow for manual control of fuel flow to a gas turbine engine, for example in a helicopter during training exercise, while incorporating safety features of an automatic fuel flow control system. The fuel flow control process 300 and the flight operating system 104 can similarly be used in various other types of vehicles and other systems, devices, and/or processes.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of controlling a gas turbine engine in a vehicle having an automatic system configured to control fuel flow, the method comprising the steps of:
    determining whether a vehicle operator is requesting to manually control fuel flow;
    determining a pre-relinquishment value of an engine operating condition while fuel flow is controlled by the automatic system;
    relinquishing fuel flow control to the vehicle operator, if the vehicle operator is requesting to manually control fuel flow and the pre-relinquishment value is within a predetermined range;
    determining a post-relinquishment value of the engine operating condition while fuel flow is controlled by the vehicle operator; and
    returning fuel flow control to the automatic system, if the post-relinquishment value is not maintained within the predetermined range.

2. The method of claim 1, wherein the engine operating condition is selected from the group consisting of: collective rotor system pitch, engine inlet temperature, engine inlet pressure, gas generator rotational speed, output shaft rotational speed, measured gas temperature, compressor discharge pressure, engine output torque, power lever angle, and rotor speed.

3. The method of claim 1, further comprising the steps of:
    determining additional post-relinquishment values, each additional post-relinquishment value being of an additional engine operating condition and having a respective predetermined range; and
    returning fuel flow control to the automatic system if one or more of the additional post-relinquishment values are outside of their respective predetermined ranges.

4. The method of claim 3, wherein the additional engine post-relinquishment values are continually determined while fuel flow is controlled by the vehicle operator.

5. The method of claim 3, further comprising the steps of:
    comparing two or more of the additional post-relinquishment values; and
    returning fuel flow control to the automatic system if the comparison is outside of a predetermined comparison range.

6. The method of claim 1, further comprising the steps of:
    determining whether any of a plurality of engine control channels are operating with at least a predetermined level of health while fuel flow is controlled by the vehicle operator; and
    returning fuel flow control to the automatic system if none of the engine control channels are operating with at least the predetermined level of health.

7. The method of claim 1, further comprising the steps of:
    determining additional pre-relinquishment values of a plurality of additional engine operating conditions, each additional pre-relinquishment value being of an additional engine operating condition and having a respective predetermined range; and
    relinquishing fuel flow control to the vehicle operator only upon the further condition that each of the pre-relinquishment values are within their respective predetermined ranges.

8. The method of claim 1, further comprising the steps of:
    determining whether any of a plurality of engine control channels are operating with at least a predetermined level of health while fuel flow is controlled by the automatic system; and
    returning fuel flow control to the vehicle operator only upon the further condition that at least one of the engine control channels is operating with at least the predetermined level of health.

\* \* \* \* \*